(12) United States Patent
Sistaninia et al.

(10) Patent No.: US 10,746,055 B2
(45) Date of Patent: Aug. 18, 2020

(54) FLOATING SUPPORT ASSEMBLY FOR COMPENSATING FOR AXIAL THERMAL EXPANSION

(71) Applicant: ANSALDO ENERGIA SWITZERLAND AG, Baden (CH)

(72) Inventors: Meisam Sistaninia, Brugg (CH); Diego Ugel, Würenlos (CH); Giovanni Cataldi, Zurich (CH); Martin Schaefer, Oberrohrdorf (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 571 days.

(21) Appl. No.: 15/481,547

(22) Filed: Apr. 7, 2017

(65) Prior Publication Data
US 2017/0292408 A1 Oct. 12, 2017

(30) Foreign Application Priority Data
Apr. 8, 2016 (EP) ..................................... 16164587

(51) Int. Cl.
*F01D 25/26* (2006.01)
*F01D 25/24* (2006.01)
*F02C 7/20* (2006.01)

(52) U.S. Cl.
CPC ............. *F01D 25/26* (2013.01); *F01D 25/24* (2013.01); *F02C 7/20* (2013.01);
(Continued)

(58) Field of Classification Search
CPC ........ F01D 25/26; F01D 25/28; F01D 25/246; F01D 25/24; F02C 7/20
See application file for complete search history.

(56) References Cited

U.S. PATENT DOCUMENTS 3,366,365 A * 1/1968 Rizk ....................... F01D 25/28
                                                            415/138
5,207,560 A * 5/1993 Urban ...................... F04D 7/06
                                                            277/411
(Continued)

FOREIGN PATENT DOCUMENTS

CN     103 344 511 A     10/2013
GB       1152252 A  *    5/1969    ............. F01D 25/24
(Continued)

OTHER PUBLICATIONS

Search Report dated Sep. 28, 2016, by the European Patent Office for International Application No. 16164587.4.
(Continued)

*Primary Examiner* — Michael Lebentritt
*Assistant Examiner* — Topaz L. Elliot
(74) *Attorney, Agent, or Firm* — Buchanan, Ingersoll & Rooney PC (57) ABSTRACT

An assembly of at least two members. One of the members supports the other member, the assembly defining an axial direction, a radial direction, and a circumferential direction, an inner member of the at least two members being received radially inside an outer member of the at least two members, wherein the inner member and the outer member am attached to each other by a support arrangement, the support arrangement including at least one floating support assembly as a displaceable coupling between an inner member support point provided at the inner member and an outer member support point provided at the outer member. A displacement of support points in a radial direction results in an interrelated relative displacement of the support points in an axial direction end vice versa.

14 Claims, 3 Drawing Sheets

(52) U.S. Cl.
CPC .... *F05D 2200/264* (2013.01); *F05D 2220/32* (2013.01); *F05D 2230/642* (2013.01); *F05D 2240/14* (2013.01); *F05D 2250/314* (2013.01); *F05D 2250/36* (2013.01); *F05D 2250/41* (2013.01); *F05D 2260/30* (2013.01); *F05D 2300/5021* (2013.01)

(56) References Cited

U.S. PATENT DOCUMENTS

| | | | |
|---|---|---|---|
| 5,967,660 A | 10/1999 | Akpan | |
| 6,406,256 B1* | 6/2002 | Marx | F01D 11/16 415/138 |
| 6,752,591 B2* | 6/2004 | Hain | F01D 9/04 415/136 |
| 7,089,748 B2 | 8/2006 | Tiemann | |
| 7,704,042 B2* | 4/2010 | Brueckner | F01D 9/042 415/121.3 |
| 8,591,182 B2* | 11/2013 | Morgenstern | F01D 9/042 415/138 |
| 8,616,007 B2* | 12/2013 | Charron | F01D 9/023 60/796 |
| 9,551,238 B2* | 1/2017 | Chang | F01D 25/246 |
| 2005/0086945 A1 | 4/2005 | Tiemann | |
| 2013/0163905 A1* | 6/2013 | Vintinner | F16C 33/04 384/155 |
| 2014/0093358 A1* | 4/2014 | Chang | F01D 25/246 415/136 |
| 2014/0192837 A1 | 7/2014 | Buchholz | |
| 2014/0263737 A1* | 9/2014 | Pierluissi | F02K 1/1207 239/265.39 |
| 2016/0003192 A1 | 1/2016 | Roberge | |
| 2016/0201515 A1* | 7/2016 | Chang | F01D 25/246 60/805 |

FOREIGN PATENT DOCUMENTS

| | | |
|---|---|---|
| WO | WO 2014/137553 A1 | 9/2014 |
| WO | WO 2015/065563 A2 | 5/2015 |

OTHER PUBLICATIONS

Search Report dated Sep. 28, 2016, by the European Patent Office for International Application No. 16164583.3.

Song et al., "Thermal fatigue on pistons induced by shaped high power laser. Part I: Experimental study of transient temperature field and temperature oscillation", International Journal of Heat and Mass Transfer, Jan. 2008, pp. 757-767, vol. 51, No. 3-4.

\* cited by examiner

FLOATING SUPPORT ASSEMBLY FOR COMPENSATING FOR AXIAL THERMAL EXPANSION

PRIORITY CLAIM

This application claims priority from European Patent Application No. 16164587.4 filed on Apr. 8, 2016, the disclosure of which is incorporated by reference.

TECHNICAL FIELD

The present disclosure relates to an assembly of at least two members, in particular of engine components. The members may comprise in particular an inner casing and an outer casing of a gas turbine engine, and more in particular a rotor cover and a housing of a gas turbine engine.

BACKGROUND OF THE DISCLOSURE

In many technical applications, engine components or other members are radially nested one within the other, wherein one of the members supports the other. For the support, support assemblies are provided which couple conjugated support points of the members with each other. Upon being charged with a hot fluid flow of rapidly changing temperature, those members may respond to the temperature change with different response times. That means, upon a temperature change of a hot fluid flow, an inner member may follow the temperature change slower or faster than the outer member. This in turn may result in significantly different thermal expansion of the members. It is thus known in the art to provide a support arrangement which allows relative displacement of conjugated support points of the inner and the outer member in a radial direction, that is, a radially floating support assembly is provided. In providing radially floating support assemblies, a relative displacement of conjugated support points is enabled, which in turn enables unobstructed differential radial thermal expansion of the members. In order to ease the assembly and disassembly of the engine, the supports are commonly arranged in one cross sectional plane, or at one axial position. However, if any of the members exhibits a certain magnitude of axial extent, that is, axial ends of the members cantilever from the support points, an axial end of one of the members displaces relative to the other member upon differential thermal expansion of the members. In other words, an axial end of one member will be provided at different axial positions with reference to the other member, dependent on the state of differential thermal expansion. This may lead to detrimental effects if, for instance, an axial end of the inner member is intended to be provided adjacent a further member for the purpose of sealing a flow. This holds in particular true if the axially adjacent members are not fixedly attached to one another, or are intended to perform a relative movement, such as, for instance, if one of the members is a stationary member and the other one is a rotating member in an engine. Differential thermal expansion between the inner member and the outer member may then lead to either large gaps between the axially adjacent members and related leakage flows, or high mechanical pressure between the abutting members, contact between relatively moving engine components, and potentially mechanical damages.

An exemplary instance is found at the first or inlet guide vanes of an expansion turbine of a turboengine, and in particular of a gas turbine engine, and at the interface of a first guide vane row to an adjacent first row of running blades. The inlet guide vanes of an expansion turbine, provided immediately downstream a combustor in case of a gas turbine engine, or, more generally, of a working fluid inlet, are typically supported at an outer radius of the guide vane members and at a hub side of the guide vane members, such as to appropriately support the forces due to the pressure differential over the first guide vane row at the high temperatures present at the first guide vane row. The radially outer end of a first row guide vane member is typically supported by a turbine housing. For aerodynamic reasons, the hub side support may not be provided straight and radially from the housing, but may be provided by the rotor cover which in turn extends an axial distance along the rotor from its own support. It is a well-known fact that, upon a change of the temperature of a working fluid of a turboengine entering the expansion turbine, the rotor cover and the turbine housing respond to the temperature change of the fluid with different time constants. Commonly, the rotor cover follows the working fluid temperature change significantly faster than the turbine housing. This is not an issue if the turboengine operates with a by and large constant temperature of the fluid entering the expansion turbine. In these cases the rotor cover and the housing will be at essentially constant and largely equal temperatures. Thus, both members will experience an essentially equal thermal expansion. Steady state thermal expansion of the housing and the rotor cover may thus be easily accounted for. However, in case of significant load changes of the turboengine, which go hand in hand with changes of the temperature of the fluid entering the expansion turbine, differential thermal expansion of the housing and the rotor cover need to be considered. This becomes most accentuated upon a fast loading of the engine form idle or even standstill to a high engine load. Due to a differential thermal expansion of the rotor cover and the housing of the turboengine, the hub side of the turbine inlet vane is axially displaced with respect to the radially outer side. The vane members tilt, and hub side axial gaps open or close, and may need to be dimensioned larger than required for steady state operation, potentially causing enhanced fluid leakages and related performance degradation at steady state operation. Widening of gaps during operation states without thermal matching of the housing and the rotor cover may cause additional performance penalties during these phases of operation. It may take several hours until thermal steady state and thermal matching is achieved. In today's grid operation, turboengine power plants, and in particular gas turbine and combined cycle power plants, are increasingly used as peak load engines, with frequent significant and fast load changes. The operation times in which no thermal equilibrium of the engine components is achieved, and accordingly significant dimensional mismatch due to differential thermal expansion is present, may thus cumulate to a significant share of the overall operation time, and cumulative performance losses become increasingly relevant for the power plant operator.

Lineout of the Subject Matter of the Present Disclosure

It is an object of the present disclosure to describe an assembly of the kind essentially mentioned. It is a more specific object to disclose an assembly in which a compensation for differential thermal expansion of at least two members of the assembly in an axial direction of the assembly is achieved. In a more specific aspect, the assembly is disclosed such that a radial differential expansion of an inner member and an outer member, wherein one of the members supports the other member, results in a guided axial displacement of support points of a member with respect to conjugated support points of the other member. In a further aspect, the assembly is part of a turboengine, and in more particular instances of a gas turbine engine. In a more specific instance, the members of the assembly are an inner casing and an outer casing of a turboengine, wherein the inner casing is supported within the outer casing. In still more specific instances, the members are a housing of the turboengine and a rotor cover of the turboengine. In even more specific instances, a guide vane blading member is supported at a radially outer side by the outer member, in particular an outer casing or a housing of the turboengine, and a hub side of the guide vane blading member is supported by the inner member, in particular an inner casing or a rotor cover. The guide vane blading member may in particular be a guide vane blading member of an inlet guide vane, that is, a member of a first or inlet guide vane of an expansion turbine, and still more in particular interposed between a combustion chamber and a first running blade row of an expansion turbine in a gas turbine engine. It is understood in this respect that the guide vane blading member may comprise one or more airfoils. It is in these instances an object of the present disclosure to provide the assembly such that axial reference positions, in particular the support positions for a guide vane member, of the inner and outer casings at least essentially remain at a predetermined axial position referred to the other one of the inner and outer casing, even if the inner and outer casings experience different thermal expansion. In further instances, it is an object of the present disclosure to disclose the assembly such that a predetermined position with respect to an axially abutting element of the turboengine is maintained in operation states where the inner and outer casing experience different thermal expansion. In a more specific instance it is an object to provide a support for an inlet guide vane element such that the radially outer side of the guide vane element and the hub side of the guide vane element are simultaneously and at least essentially equally displaced in the axial direction in operation states where the inner casing and the outer casing experience different thermal expansion. Such, tilting of the inlet guide vane blading member is at least essentially avoided. In other aspects, it is an object to disclose an assembly wherein a gap between the hub side of an inlet guide vane blading member and an axially adjacent rotor face is at least essentially maintained constant even in operation states where the inner casing and the outer casing experience different thermal expansion.

Further effects and advantages of the disclosed subject matter, whether explicitly mentioned or not, will become apparent in view of the disclosure provided below. Accordingly, disclosed is an assembly of at least two members, wherein one of the members supports the other member, the assembly defining an axial direction, a radial direction, and a circumferential direction. An inner member of said at least two members is received radially inside an outer member of said at least two members. The inner member and the outer member are attached to each other by a support arrangement, the support arrangement comprising at least one floating support assembly. The floating support assembly provides a displaceable coupling between an inner member support point provided at the inner member and an outer member support point provided at the outer member. The floating support assembly is arranged and configured to provide for a guided relative displacement between the inner member support point and the outer member support point along a displacement path. The displacement path of the relative displacement is inclined with respect to the axial direction as well as to the radial direction at a nonzero angle, such that a relative displacement of the support points in the radial direction results in an interrelated displacement of the support points in the axial direction and vice versa. The floating support assembly which provides a guided and interrelated displacement in the radial and axial directions will also be referred to hereinafter as a guided displacement floating support assembly. Accordingly, a relative displacement in the radial direction of the conjugated support points which are coupled by the floating support assembly effects a guided and controlled simultaneous axial relative displacement of the conjugated support points. Thus, if for instance an axial end of one of the members is provided at an axial distance from the respective member support point, or cantilevers from the support point, and is displaced relative to the support point due to thermal expansion, the displacement due to thermal expansion may, dependent on the kinematics of the floating support assembly, at least partially be offset by an axial displacement of the support point of the member with respect to the support point of the other member. When thermal equilibrium between the two members is achieved, and differential thermal expansion accordingly vanishes, or at least essentially vanishes, the relative axial displacement of the conjugated support points is reduced. The axial relative displacement of the conjugated support points thus is controlled by differential thermal expansion and the kinematics of the floating support assembly. It is thus enabled to provide the assembly such that a displacement of a cantilevering reference point of one of the members with respect to a reference position of the other member may be controlled in a self-sustaining manner.

The displacement path may be straight of curved. In certain instances the displacement path may exhibit an arcuate or part-circular geometry.

It is noted that in this respect the term thermal expansion is intended to designate thermally induced growth as well as thermally induced shrinking of a member.

It is understood that the assembly may comprise more than one guided displacement floating support assemblies, wherein each of the guided displacement floating support assemblies couples two conjugated support points of the inner and the outer member.

In certain embodiments, the inner member and the outer member are fixedly attached to each other in the circumferential direction. By virtue of these specific embodiments the members are attached to each other with circumferentially fixed relative positions to each other, while providing the above-mentioned relative interrelated displacement capabilities in the radial and the axial direction. This may be achieved in providing at least one circumferentially fixed support assembly. Said circumferentially fixed support arrangement may be provided in that at least one guided displacement floating support arrangement is provided to fix the relative position of conjugated support points of the inner and outer member in the circumferential direction. In other embodiments, at least one dedicated circumferentially fixed support arrangement may be provided. It is understood that a dedicated circumferentially fixed support assembly is provided as a floating support in the axial and radial direction. However, in the dedicated circumferentially fixed support assembly the displacement is not guided, i.e. the radial and axial displacement are not interrelated to each other. In still other words, a radial displacement does not result in a forced axial displacement, nor vice versa. It is conceivable that both kinds of circumferentially fixed support assemblies, that is, at least one dedicated circumferentially fixed support assembly and at least one circumferentially fixed guided displacement floating support assembly, may be present in the assembly of the members to attach the inner and the outer member to each other.

In further instances, at least one floating support assembly is provided as an assembly of a female suspension element provided on one of the inner and outer members and a mating male suspension element provided on the other one of the inner and outer members, wherein the male suspension element is received within the female suspension element in a sliding displacement relationship, wherein further the sliding displacement is a guided displacement along a displacement path which is inclined with respect to the axial direction as well as to the radial direction at a nonzero angle. In that the male suspension element is provided in the female suspension element and may displace inside the female suspension element, the floating support capability is provided.

In this respect, the male suspension element and the female suspension element may be shaped and dimensioned such as to provide a snug fit with each other at least in the axial and the radial direction. This provides for the guided and interrelated displacement.

In certain more specific embodiments, the female suspension element comprises a cavity, the cavity comprising a cavity axis extending along the displacement path, and the male suspension element comprises a protrusion, the protrusion comprising an axis extending along the displacement path, and the protrusion being received within the cavity.

The displacement path may extend along a straight line, in particular a straight line which is slanted with respect to the radial as well as to the axial direction, thus providing a fixed interrelation of an axial and a radial relative displacement of the respective conjugated support points.

In further instances, at least one floating support assembly comprises a beam, said beam being pivotally linked to the inner member support point and the outer member support point. Thus, a mobile link coupling between two conjugated support points may be provided. It is understood that due to the pivotable link provided by the beam connecting two conjugated support points, the support points are forced to perform a circular movement respective to each other if, due to a differential thermal expansion of the inner and outer member, a relative displacement of the of two conjugated support points is initiated. Thus, in particular if the beam is provided at a nonzero angle to the radial direction, interrelated axial and radial displacements are effected. In this respect, said inner member support point and said conjugated outer member support point may be located offset with respect to each other in the axial direction.

In further instances of the above-mentioned embodiments, in order to restrict the relative displacement of conjugated support points to a radial and an interrelated axial displacement, and to enable the radial and interrelated axial displacement, a pivot axis of the beam and the outer member support point and a pivot axis of the beam and the inner member support point may be provided to extend at least essentially in the circumferential direction.

In further aspects of the present disclosure, at least two floating support assemblies may be provided at different circumferential positions in a gap formed between the inner and the outer member, and are circumferentially distributed and may in particular be arranged on circumferentially opposing sides of the inner member. Such, a radial positioning of the inner member inside the outer member is achieved.

As briefly indicated above, in certain exemplary instances one of the inner member and the outer member comprises a first axial reference position which is referred to and located at a second axial reference position of the other one of the inner member and the outer member. The kinematics of the floating support assembly may in these exemplary instances be provided such that upon a differential thermal expansion of the inner member and the outer member the radial relative displacement of the conjugated inner member support points and outer member support points due to the differential radial expansion results in an axial relative displacement of the conjugated support points which compensates for the differential axial expansion between the support points and the reference positions, such that the axial reference positions remain essentially at a constant mutual relative position.

In instances where a multitude of guided displacement floating support assemblies are provided, the respective inner member support points may at least essentially be arranged in one common cross section of the inner member taken perpendicular to the axial direction.

In a further aspect of the present disclosure, the assembly comprising the inner member and the outer member may be arranged with the axial direction being provided horizontally. In said instance, exemplary embodiments are conceivable wherein at least one vertical support assembly is provided laterally of the inner member and between the inner member and the outer member, the vertical support assembly providing fixation in the circumferential direction, and at least one guided displacement floating support arrangement is provided in an upper half of the assembly and at least one floating support arrangement is provided in a lower half of the assembly.

In specific embodiments, the assembly is part of a turboengine, and the axial direction is defined by a rotor axis of the turboengine. In more particular embodiments the turboengine is a gas turbine engine. The inner member may be an inner casing of the turboengine and the outer member may be an outer casing of the turboengine. The inner member may be a rotor cover of the turboengine and the outer member may be a housing of the turboengine. The outer member may support an outer end of a guide vane blading member, and the inner member may support a hub side of the guide vane blading member. In particular, the hub side of the guide vane blading member may be supported at a cantilevering axial end of the inner member, i.e. at an axial distance from the support points of the inner member which are connected to a guided displacement floating support assembly. Further in particular the guide vane blading element may be a guide vane element of a most upstream first or inlet guide vane row of an expansion turbine. The first or inlet guide vane row may be provided adjacent a combustor of a gas turbine engine, and in particular be interposed between a combustor and a first row of running blades of an expansion turbine. The inner member, or rotor cover, may extend at least partly along an axial extent of the combustor, and may furthermore be placed radially inside the combustor.

It is understood that the features and embodiments disclosed above may be combined with each other. It will further be appreciated that further embodiments are conceivable within the scope of the present disclosure and the claimed subject matter which are obvious and apparent to the skilled person.

BRIEF DESCRIPTION OF THE DRAWINGS

The subject matter of the present disclosure is now to be explained in more detail by means of selected exemplary embodiments shown in the accompanying drawings. The figures show FIG. 1 a schematic illustration of an assembly of a rotor cover, a turboengine housing, a combustor and an inlet guide vane, wherein the rotor cover is supported by the housing as known in the art.

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

EXEMPLARY MODES OF CARRYING OUT THE TEACHING OF THE PRESENT DISCLOSURE

Figure 1:
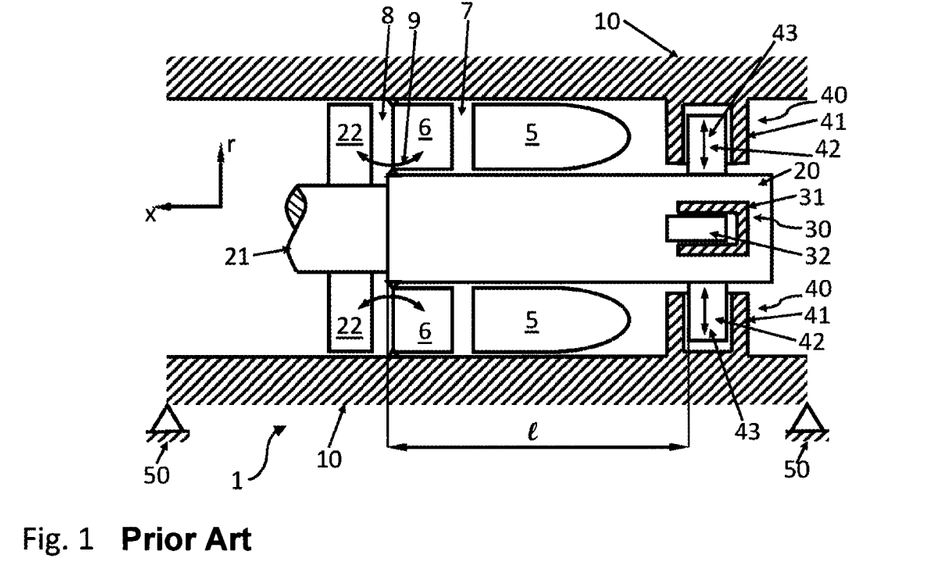

FIG. 1 depicts in a schematic illustration an assembly 1 as known from the art, wherein the assembly 1 is part of a gas turbine engine. Assembly 1 comprises a housing 10 of the gas turbine engine and a rotor cover 20 of the gas turbine engine. The assembly defines an axial direction, denoted by x, a radial direction denoted by r, and a circumferential or tangential direction, as is readily apparent to the person skilled in the art. The housing is, directly or indirectly, supported on a foundation 50. It is appreciated, that due to the presence of the foundation a vertical direction is defined, with foundation 50 constituting the bottom. Rotor cover 20 is received radially inside housing 10. In this respect, housing 10 constitutes an outer member of the assembly, while rotor cover 20 constitutes an inner member of the assembly. While housing 10 is supported on foundation 50, housing 10 supports rotor cover 20. Rotor cover 20 is attached to housing 10 by a support arrangement comprising a multitude of support assemblies. The support arrangement comprises a vertical or circumferential support assembly 30. Vertical support assembly 30 comprises a male suspension element 32 which is provided on rotor cover 20, and is received within a female suspension element 31 which is provided on housing 10. It is understood that in other embodiments the male suspension element may be provided on the housing, while the female suspension element may be provided on the rotor cover. Vertical support assembly 30 is provided such that male suspension element 32 may displace with respect to female suspension element 31 in the axial and the radial direction. Vertical support assembly 30 and thus fixes a relative position of housing or outer member 10 and rotor cover or inner member 20 in the vertical, and thus also in the circumferential, direction, while allowing a displacement in the radial and the axial direction. Support assemblies 40 are provided to achieve an axial positioning of rotor cover, or inner member, 20 in housing, or outer member, 10. Each of support assemblies 40 comprises a male suspension element 42 which is received in a female suspension element 41. Male suspension element 42 is provided on the rotor cover, while female suspension element 41 is provided on inner housing 10; as noted above with respect to vertical support assembly 30, the arrangement may be vice versa, that is, male suspension element 42 being provided at outer member or housing 10, and female suspension element 41 provided at inner member or rotor cover 20. Male suspension elements 42 are received within female suspension elements 41 with a snug fit in an axial direction, thus providing support in the axial direction. However, male suspension elements 42 are floatingly received within female suspension elements 41 in a sliding displacement relationship, wherein the sliding displacement is a guided displacement along a displacement path denoted at 43. Displacement path 43 in this instance is purely radial. Thus, the male suspension elements may slide inside the female suspension elements in the radial direction in order to allow unrestricted radial differential thermal expansion of rotor cover 20 and housing 10. Floating support assembly 40 provides guided displacement of male suspension element 42 inside female suspension element 41 and prevents motion perpendicular to the displacement path, at least in a plane span up by the radial direction r and the axial direction x. It may thus also be referred to as a guided displacement floating support assembly. The location of a suspension element on rotor cover 20 defines an inner member support point. Likewise, the location of a suspension element on housing 10 defines an outer member support point. Floating support assembly 40 thus provides a displaceable coupling between an inner member support point provided at the rotor cover and an outer member support point provided at the housing. Rotor cover 20 extends or cantilevers a distance e from the inner member support point. Further, a rotor shaft 21 is provided radially inside rotor cover 20. Rotor shaft 21 bears, inter alia, the running blades of an expansion turbine, of which first stage running blades 22 are shown. During operation of the gas turbine engine, hot working fluid from combustor 5 enters the expansion turbine through a first or inlet guide vane row, of which blading members 6 are shown. The Inlet guide vane is subject to a high pressure differential, and is at the same time exposed to the highest temperatures with in the expansion turbine. Inlet guide vane members 6 are thus not only supported on their radially outer side by housing 10, but are moreover supported on their hub side by rotor cover 20. It will be appreciated that the support locations of inlet guide vane members 6 are provided to maintain the inlet guide vane members at a nominal position and orientation upon steady-state operation of the gas turbine engine, that is, when the temperature of rotor cover 20 and housing 10 is at least essentially equal. An axial gap 7 between the first guide vane row and combustor 5 may be sealed by suitable means which are known to the skilled person. Further, an axial gap 8 is required between the row of inlet guide vane members 6 and the row of first expansion turbine running blades 22 to enable relative movement between the stationary guide vane elements and the rotating blades and avoid rubbing and consequential damage. Upon startup or shutdown of the gas turbine engine, or during other operational transients which are related to a fast and significant temperature change of the working fluid, the gas turbine engine rotor cover 20 will follow the temperature change faster than housing 10. That is, rotor cover 20 will experience thermal expansion upon a temperature increase or thermal shrinking upon a temperature decrease faster than housing 10. Upon differential thermal expansion of rotor cover 20 and housing 10, the radially outer and hub side support locations of inlet guide vane members 6 will be displaced in the axial direction relative to each other. This causes a swiveling displacement of the hub side of an inlet guide vane member 6, relative to its radially outer support at the housing, as indicated at 9. Upon a temperature increase, for instance at startup of the gas turbine engine, the hub side of an inlet guide vane member will be displaced towards running blades 22. Upon the temperature decrease, for instance at shutdown of the gas turbine engine, the hub side of an inlet guide vane member will be displaced towards combustor 5. Thus, in order to maintain a functionally required gap width even in operation states when a gap width reaches a minimum value, the width of gaps 7, 8 must be designed larger than required for steady state operation. This results in a performance penalty and/or more expensive sealing measures. Moreover, any of gaps 7, 8 may further enlarge in transient operation states.

Figure 2:
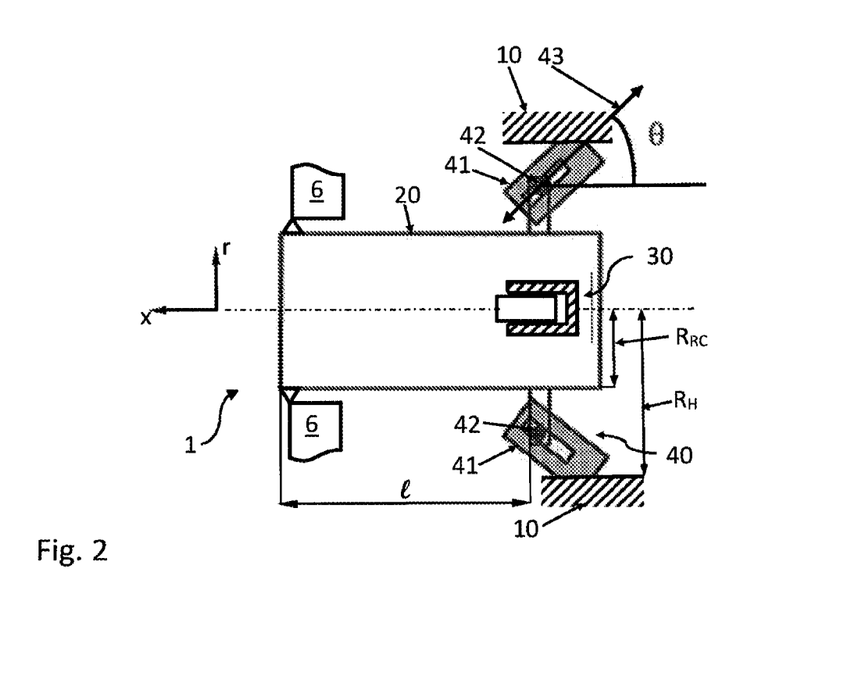
FIG. 2 a schematic illustration of a support of the rotor cover inside the housing in accordance with the present disclosure.

In the schematically shown embodiment of FIG. 2, floating support assemblies 40 are thus provided with displacement path 43 inclined with respect to the axial direction x at a nonzero angle $\Theta$, wherein $\Theta \neq 90°$, and accordingly with respect to the radial direction a nonzero angle $90°-\Theta$. Just as in the prior art embodiment of FIG. 1, floating support assembly 40 provides guided displacement of male suspension element 42 inside female suspension element 41 and prevents motion perpendicular to the displacement path, at least in a plane span up by the radial direction r and the axial direction x. It may thus also be referred to as a guided displacement floating support assembly. However, in the embodiments as herein described a radial displacement forces also an axial displacement, as will be lined out in more detail below. A radius at which the inner member support points are provided at rotor cover 20 is denoted by $R_{RC}$, and a radius of the housing 10 on which the outer member support points are provided is denoted by $R_H$. For practical purposes, it may be assumed that in a turboengine the difference between the named radii is significantly smaller than the radii themselves, so for the considerations below it is assumed that $R_{RC} \approx R_H \approx R$. It may likewise be assumed that the offset between the inner and outer member support points in the axial direction is considerably smaller than cantilevering distance l. If the absolute temperature difference between the inner member or rotor cover 20 and the outer member or housing 10 is $\Delta T$, female support element 41 and male support element 42 of any of guided displacement floating support assemblies 40 displace relative to each other, compared to steady state operation with no temperature difference, by $$\Delta r = R \cdot \alpha \cdot \Delta T,$$

wherein $\alpha$ is a thermal expansion coefficient. For the ease of consideration it is assumed that the thermal expansion coefficient is equal for the housing and the rotor cover. As will become apparent below, a difference in the thermal expansion coefficients of housing and rotor cover will have no or only a minor influence on the result to be achieved. Female suspension element 41 and male suspension element 42 provide a mutual guided displacement along displacement path 43. Thus, a radial displacement $\Delta r$ forces an axial relative displacement $\Delta x$ of female suspension element 41 and male suspension element 42. It will be appreciated that the support points of the housing and the rotor cover, at which the suspension elements are provided, will displace relative to each other by the same distances. The supports of inlet guide vane members 6 at the housing and the rotor cover experience, at the same temperature difference, a differential axial displacement relative to the support points at the housing and the rotor cover, respectively, at $$\Delta l = l \cdot \alpha \cdot \Delta T.$$

Thus, if differential axial displacement $\Delta l$ of the inlet guide vane supports and axial relative displacement of the inner and outer member, or rotor cover and housing, respectively, support points are provided at the same absolute value, that is $\Delta l = \Delta x$, and oriented in the appropriate directions, the relative displacement of inner member and the outer member support points will offset the differential axial displacement of the inlet guide vane support, and consequently the guide vane supports at the housing and at the rotor cover will be maintained at the same axial location. Thus, if angle $\Theta$ is chosen such that $$\cot \Theta = l/R$$

the swiveling displacement of guide vane members 6 lined out above in connection with FIG. 1 may at least essentially be avoided and the gaps between the inlet guide vane members and axially abutting engine components will at least essentially remain constant, also during transient engine operation.

Figure 3:
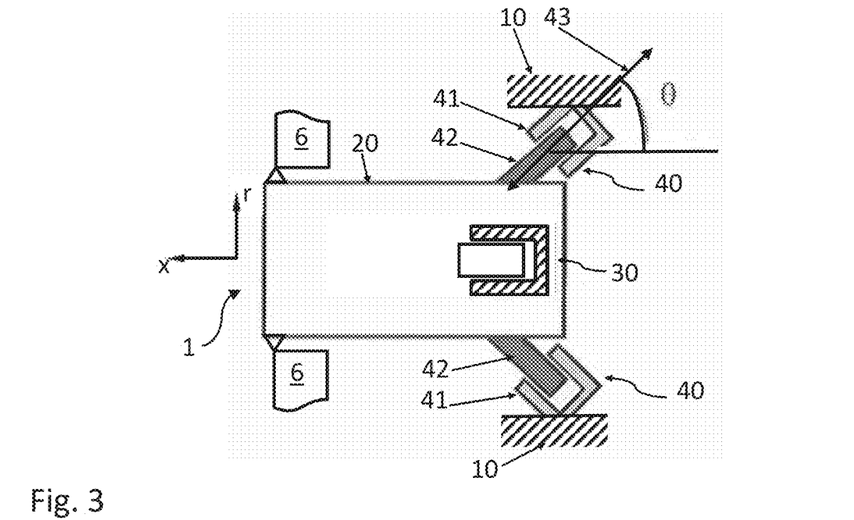
FIG. 3 a schematic illustration of a further embodiment of a support of the rotor cover inside the housing in accordance with the present disclosure.
Figure 4:
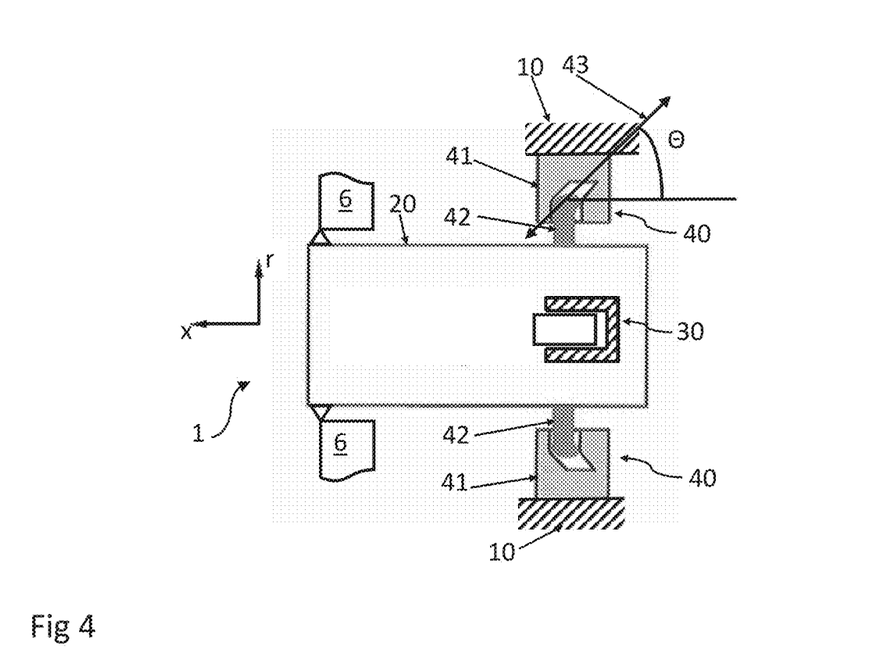
FIG. 4 a schematic illustration of still a further embodiment of a support of the rotor cover inside the housing in accordance with the present disclosure, which is particularly suitable in connection with a horizontally split housing.

In further schematically shown embodiments depicted in FIGS. 3 and 4, female suspension elements 41 and male suspension elements 42 are provided in alternative configurations. Male suspension element 42 is, in each of the embodiments, provided as a protruding element protruding from inner member or rotor cover 20, and received within a cavity provided in female suspension element 41. In any case, these embodiments fulfill a similar function as those depicted in connection with FIG. 2, as the suspension elements of floating support assembly 40 are provided displaceably along slanted displacement path 43. In the embodiment of FIG. 4, the cavity of the female suspension element 41 is angled, with a section extending radially, and another section extending at an angle obliquely to the radial direction and along displacement path 43. It is appreciated that this embodiment is specifically suited for use in cases where the turbine housing 10 is horizontally split.

Figure 5:
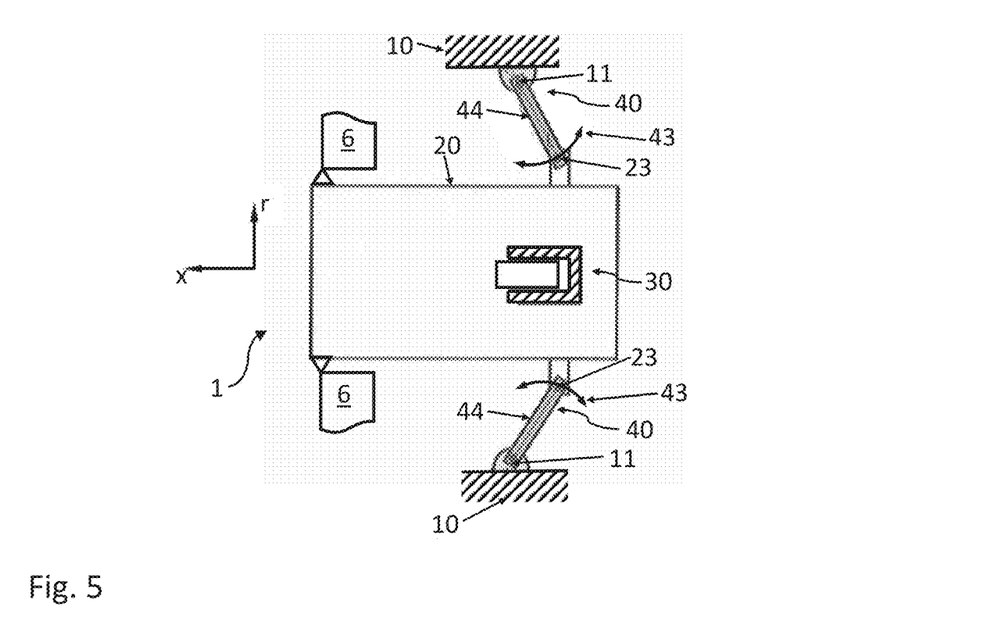
FIG. 5 a schematic illustration of a further embodiment of a support of the rotor cover inside the housing in accordance with the present disclosure, wherein a different principle is applied for the floating support.

A still alternative embodiment of floating support assembly 40 is schematically depicted in FIG. 5. Floating support assembly 40 comprises a beam 44 which is pivotally linked to an outer member support point 11 and to an inner member support point 23. An inner member support point 23 may thus displace with respect to a conjugated outer member support point 11 along an arcuate, circular, displacement path 43. An outer member support point 11 and a conjugated inner member support point 23 are offset with respect to each other in the axial direction. The connecting beam 44 is thus provided at a nonzero angle with respect to the radial direction. Thus, similar to the embodiments shown above, a radial relative displacement of two conjugated inner and outer member support points forces an axial displacement of the inner and outer member support points. By a skillful choice of the distance between two conjugated support points, and the angle at which the beam is provided with respect to the radial direction at steady-state conditions, the same effects as lined out above is achieved.

Figure 6:
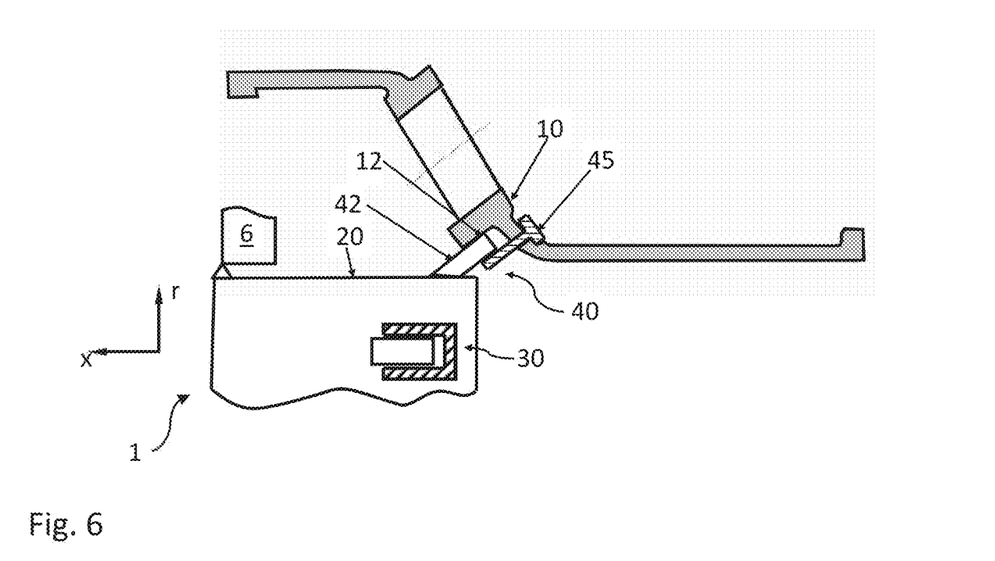
FIG. 6 a schematic view of a more detailed embodiment of a floating support assembly.

FIG. 6 depicts a more detailed embodiment of providing a guided displacement floating support assembly 40. Housing 10 comprises a support shoulder 12. When assembling the inner and outer member, or housing 10 and rotor cover 20, respectively, shoulder 12 is brought in contact with male suspension element 42 provided on inner member 20. A holding element 45 is inserted from outside housing 10, and, together with shoulder 12, forms a female suspension element in which male suspension element 42 is received and guided.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

LIST OF REFERENCE NUMERALS

1 assembly
5 combustor
6 inlet guide vane member, inlet guide vane blading member
7 axial gap
8 axial gap
9 swiveling displacement
10 housing, outer casing, outer member
11 outer member support point
12 support shoulder
20 rotor cover, inner casing, inner member
21 rotor shaft
22 first stage running blades of expansion turbine
23 inner member support point
30 vertical support assembly, circumferential support assembly
31 female suspension element
32 male suspension element
40 support assembly, floating support assembly, guided displacement floating support assembly
41 female suspension element
42 male suspension element
43 displacement path
44 beam
45 holding element
50 foundation
l cantilevering distance
r radial direction
R radius at which a support point is provided
$R_{RC}$ radius at which a support point is located at rotor cover or inner member
$R_H$ radius at which a support point is located at housing or outer member
x axial direction
Θ angle

The invention claimed is:

1. An assembly comprising:
at least two members, wherein one of the members supports the other member, the assembly defining an axial direction (x), a radial direction (r), and a circumferential direction;
an inner member of said at least two members being received radially inside an outer member of said at least two members, the inner member including a vertical support assembly for supporting the inner member on the outer member, the vertical support assembly configured to allow displacement of the inner member in the radial direction (r) and the axial direction (x) independently, wherein the inner member and the outer member are attached to each other by a support arrangement, the support arrangement including:
at least one floating support assembly, wherein the at least one floating support assembly provides a displaceable coupling between an inner member support point provided at the inner member and an outer member support point provided at the outer member, the at least one floating support assembly being arranged and configured to provide for a guided relative displacement between the inner member support point and the outer member support point along a displacement path; and
wherein the displacement path of the relative displacement is inclined with respect to the axial direction (x) as well as to the radial direction (r) at a nonzero angle (Θ), such that a relative displacement of the support points in the radial direction will result in an interrelated relative displacement of the support points in the axial direction, and vice versa, wherein the at least one floating support assembly is provided as an assembly of a female suspension element provided on one of the inner and outer members, and a mating male suspension element provided on the other one of the inner and outer members; and
wherein the male suspension element is received within the female suspension element in a sliding displacement relationship, wherein the sliding displacement is a guided displacement along the displacement path which is inclined with respect to the axial direction (x) as well as to the radial direction (r) at a nonzero angle (Θ), the displacement path having limits of movement at two ends.

2. The assembly of claim 1, wherein the inner member and the outer member are fixedly attached to each other in the circumferential direction.

3. The assembly of claim 1, wherein the male suspension element and the female suspension element are shaped and dimensioned such as to provide a snug fit with each other at least in the axial and the radial direction.

4. The assembly of claim 1, wherein the female suspension element comprises:
a cavity, the cavity having a cavity axis extending along the displacement path; and
the male suspension element includes a protrusion, the protrusion having an axis extending along the displacement path and the protrusion being received within the cavity.

5. The assembly of claim 1, wherein the displacement path extends along a straight line.

6. The assembly of claim 1, wherein the at least one floating support assembly comprises:
a beam, said beam being pivotally linked to the inner member support point and the outer member support point.

7. The assembly of claim 6, wherein said inner member support point and said outer member support point are located offset with respect to each other in the axial direction (x).

8. The assembly of claim 6, wherein a pivot axis of the beam and the outer member support point, and a pivot axis of the beam and the inner member support point, extend essentially in the circumferential direction.

9. The assembly of claim 1, wherein at least two floating support assemblies at different circumferential positions in a gap formed between the inner member and the outer member, and are circumferentially distributed, and are arranged on circumferentially opposing sides of the inner member, such as to achieve a radial positioning of the inner member inside the outer member.

10. The assembly claim 9, wherein one of the inner member and the outer member comprises:
- a first axial reference position which is referred to and located at a second axial reference position of the other one of the inner member and the outer member, wherein kinematics of the at least one floating support assembly are provided such that upon a differential thermal expansion of the inner member and the outer member, the radial relative displacement of the conjugated inner member support points and outer member support points due to the differential radial expansion will result in an axial relative displacement of the support points to compensate for the differential axial expansion between the support points and the reference positions, such that the axial reference positions remain essentially at a constant mutual relative position.

11. The assembly of claim 9, wherein the inner member support points are arranged in one cross section of the inner member taken perpendicular to the axial direction (x).

12. The assembly of claim 1, wherein the assembly is arranged with the axial direction (x) being provided horizontally, wherein the vertical support assembly is provided laterally of the inner member and between the inner member and the outer member, the vertical support assembly providing fixation in the circumferential direction, and wherein at least one floating support assembly is provided in an upper half of the assembly and at least one floating support assembly is provided in a lower half of the assembly.

13. The assembly of claim 1, wherein the assembly is part of a turboengine, and the axial direction (x) is defined by a rotor axis of the turboengine, wherein the turboengine is a gas turbine engine.

14. The assembly of claim 13, wherein the inner member is an inner casing of the turboengine and the outer member is an outer casing of the turboengine; and wherein the inner member is a rotor cover of the turboengine and the outer member is a housing of the turboengine.

* * * * *